(12) United States Patent
Robison, Jr.

(10) Patent No.: US 6,565,125 B2
(45) Date of Patent: May 20, 2003

(54) COUPLING ASSEMBLY FOR JOINING PLASTIC AND METAL PIPES

(75) Inventor: David L. Robison, Jr., Ashtabula, OH (US)

(73) Assignee: Perfection Corporation, Madison, OH (US)

( * ) Notice: Subject to any disclaimer, the term of this patent is extended or adjusted under 35 U.S.C. 154(b) by 0 days.

(21) Appl. No.: 09/843,503

(22) Filed: Apr. 26, 2001

(65) Prior Publication Data

US 2001/0035647 A1 Nov. 1, 2001

Related U.S. Application Data

(60) Provisional application No. 60/200,046, filed on Apr. 27, 2000.

(51) Int. Cl.[7] ............................. F16L 17/00; F16L 33/10
(52) U.S. Cl. .......................... 285/104; 285/4; 285/340; 285/343
(58) Field of Search ................. 285/3, 4, 340, 285/420, 104, 337, 343, 348

(56) References Cited

U.S. PATENT DOCUMENTS

| 2,779,610 | A |   | 1/1957  | Risley         |         |
|-----------|---|---|---------|----------------|---------|
| 3,069,188 | A |   | 12/1962 | Crawford       |         |
| 3,879,070 | A |   | 4/1975  | Russ           |         |
| 4,070,046 | A |   | 1/1978  | Felker et al.  |         |
| 4,092,036 | A | * | 5/1978  | Sato et al.    | 285/321 |
| 4,119,334 | A |   | 10/1978 | Steed          |         |
| 4,606,565 | A |   | 8/1986  | Royston        |         |
| 4,610,471 | A |   | 9/1986  | Halen et al.   |         |
| 4,807,912 | A | * | 2/1989  | Maier          | 285/348 |
| 5,069,490 | A |   | 12/1991 | Halen, Jr.     |         |
| 5,100,183 | A |   | 3/1992  | Montesi et al. |         |
| 5,779,285 | A |   | 7/1998  | Robison        |         |
| 6,019,396 | A | * | 2/2000  | Saito et al.   | 285/3   |
| 6,129,391 | A | * | 10/2000 | Rakieski       | 285/337 |

FOREIGN PATENT DOCUMENTS

| GB |   | 2166508 A | * | 5/1986 |
|----|---|-----------|---|--------|
| WO |   | WO 94/10493 |  | 5/1994 |

OTHER PUBLICATIONS

"Compression Joint For Spun Pipes—With Shaped Grip Segments and With Compression Ring", 1989 Derwent Publications, Ltd EP 0334380 Sep. 1989.
Maxi–Grip EZ Offers All These Benefits, . . . (See attached literature) 1991.
Dresser® "Universal" Style 90, Seal and Restraining Connections for Joining Steel and Polyethylene Pipe . . . , DMD Division, Dresser Industries; Inc Date Unknown.

* cited by examiner

Primary Examiner—Lynne H. Browne
Assistant Examiner—Aaron Dunwoody
(74) Attorney, Agent, or Firm—Fay, Sharpe, Fagan, Minich & McKee, LLP

(57) ABSTRACT

A coupling body has: (i) a central member; (ii) a first retaining member; and, (iii) a second retaining member. The first retaining member and the central member define a first pipe receiving region. The second retaining member and the central member define a second pipe receiving region having a tapered inner surface. A selectively constrictable clamp collar is located in the first pipe receiving region. A bolt or other actuation member is operably engaged with the clamp collar and is movable to constrict the clamp collar. A gripping collet is located in the second pipe receiving region and includes a tapered outer surface. At least one tie-bolt or other fastener extends between the retaining members and is selectively adjustable to draw the first and second retaining members toward each other so that the tapered inner surface engages the tapered outer surface of the collet to constrict the collet radially.

32 Claims, 4 Drawing Sheets

COUPLING ASSEMBLY FOR JOINING PLASTIC AND METAL PIPES

CROSS-REFERENCE TO RELATED APPLICATION

This application claims priority from and hereby expressly incorporates by reference U.S. provisional application Ser. No. 60/200,046 filed Apr. 27, 2000.

BACKGROUND OF THE INVENTION

The subject invention is directed toward the art of pipe couplings and, more particularly, to a coupling assembly for joining two relatively large diameter coaxial pipes or tubes made from different materials. The invention is especially suited for joining a plastic pipe to a steel pipe in a gas distribution system and will be described with reference thereto. As will become apparent, however, the invention is capable of broader application and could be used for joining other types of pipes and in a variety of different environments.

In the gas distribution industry, it is often necessary to join an end of a plastic pipe to an aligned end of a steel or cast iron metal pipe. The couplings used for this purpose must be capable of being quickly assembled to provide a perfectly sealed connection designed to resist substantial axial pull-out loads. Further, the coupling assembly must be capable of maintaining a leak-proof joint even if some axial creep of either pipe takes place. In addition to the above, it is highly desirable that a pipe coupling assembly of this nature be capable of functioning in extremely corrosive environments.

SUMMARY OF THE INVENTION

The subject invention provides a pipe coupling assembly that satisfies the above needs and provides an extremely effective joint. The assembly is relatively simple to make up and can be readily disassembled if required. The coupling includes a coupling body that has: (i) a central member; (ii) a first retaining member; and, (iii) a second retaining member. The first retaining member and the central member define a first pipe receiving region. The second retaining member and the central member define a second pipe receiving region having a tapered inner surface. A selectively constrictable clamp collar is located in the first pipe receiving region. A bolt or other actuation member is operably engaged with the clamp collar and is movable to constrict the clamp collar. A gripping collet is located in the second pipe receiving region and includes a tapered outer surface. At least one tie-bolt or other fastener extends between the retaining members and is selectively adjustable to draw the retaining members toward each other so that the tapered inner surface engages the tapered outer surface of the collet to constrict the collet radially.

One advantage of the present invention is the provision of a pipe coupling assembly specifically adapted for joining a plastic pipe to a metal pipe.

Another advantage of the present invention is the provision of a pipe coupling assembly for joining plastic to metal pipe that assures proper compression and engagement of the gaskets and gripping rings on make up.

A further object of the invention is the provision of a coupling assembly of the type described wherein a convenient and effective mechanism is employed for gripping a metal pipe end that does not require a torque wrench to ensure proper tightening and also to prevent overtightening, and that is releasable if required.

A still further object is the provision of an assembly of the general type described wherein the gasket and gripping or clamp rings are totally enclosed when the assembly is in the made-up condition.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENT

Figure 1:
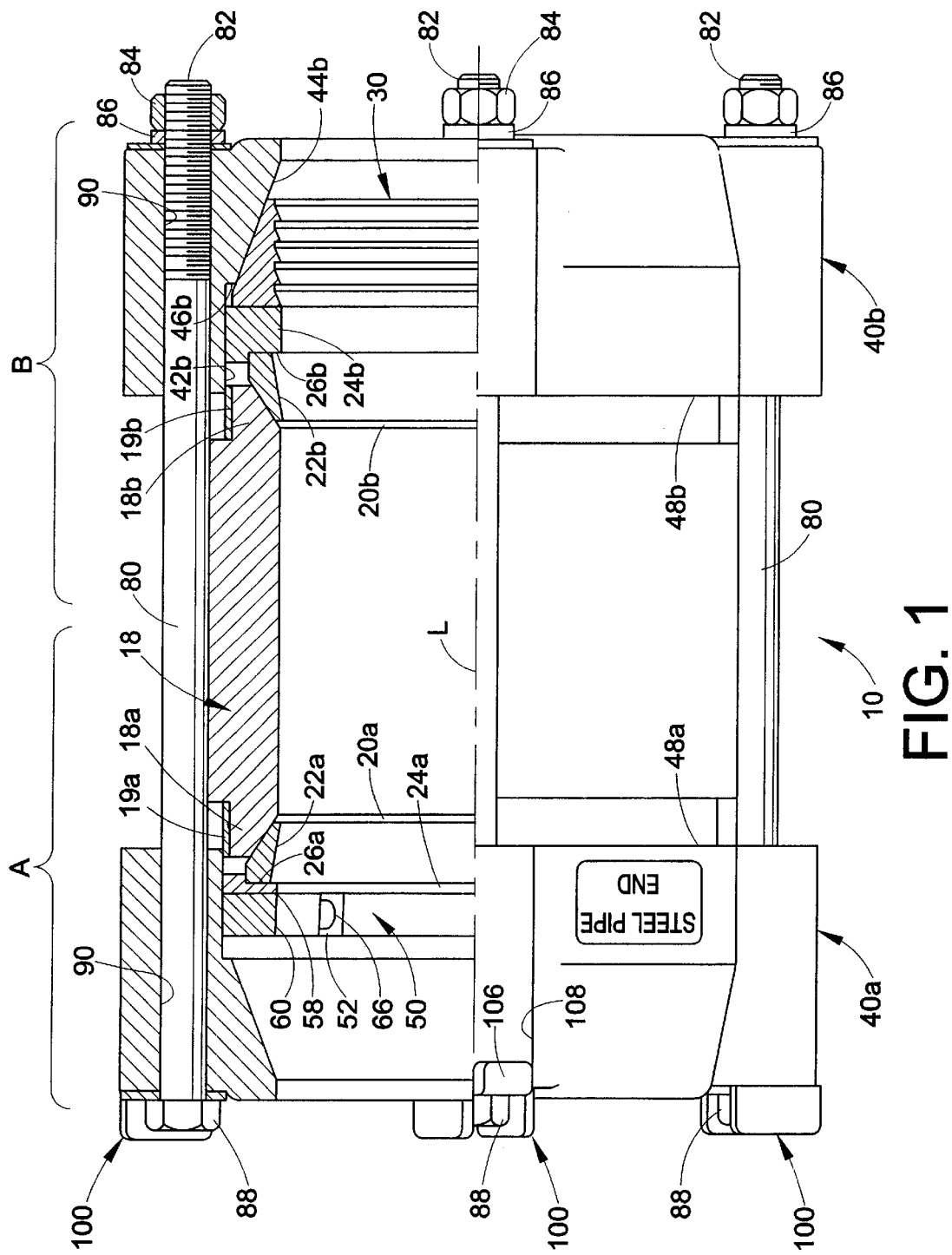
FIG. 1 is a view, partially in section and partially in elevation, of a coupling assembly formed in accordance with the present invention.
Figure 2:
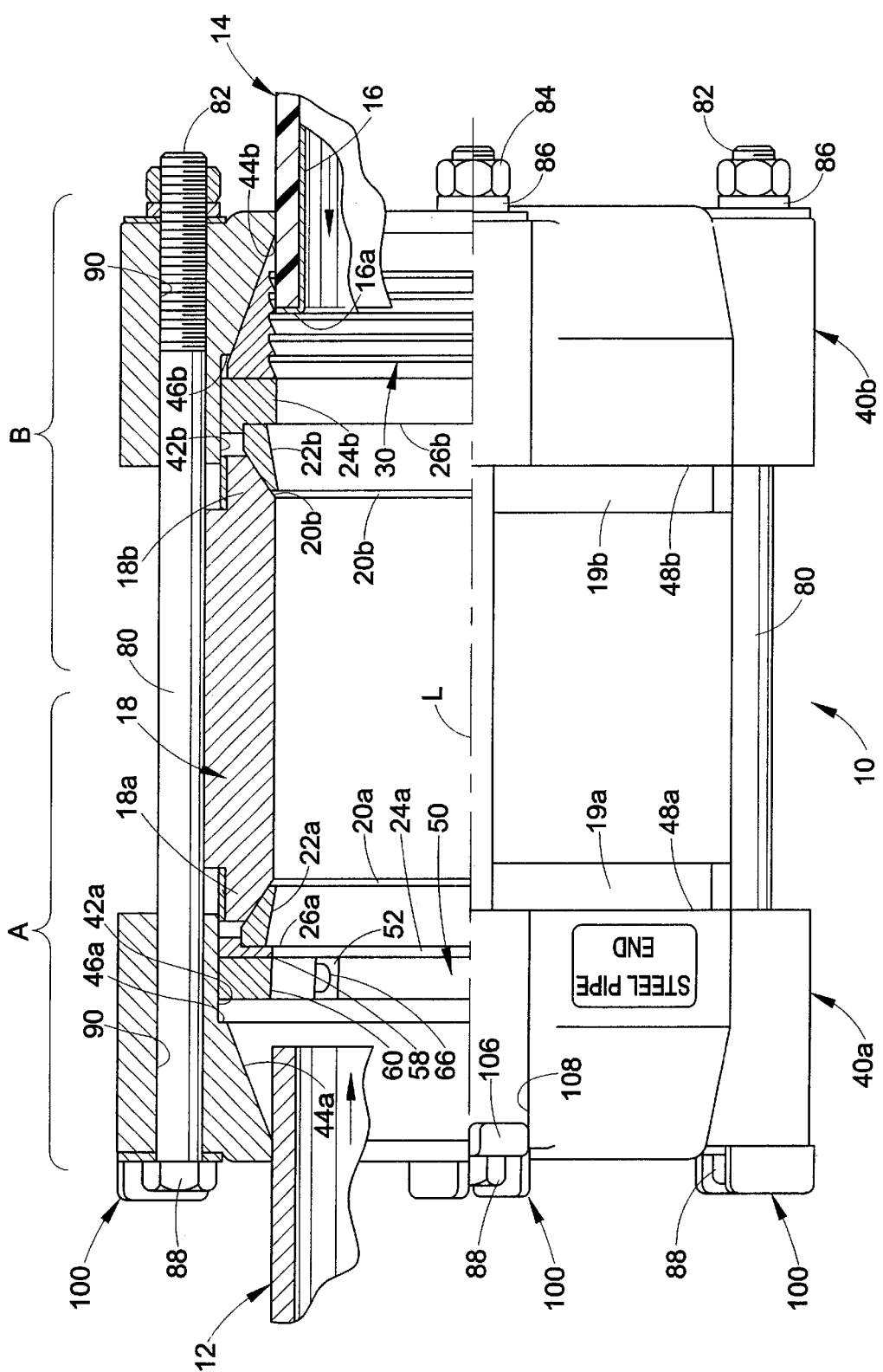
FIG. 2 is a view of the coupling assembly shown in FIG. 1 and also showing an associated metal pipe partially inserted in a first end of the coupling and an associated plastic pipe partially inserted in a second end of the coupling.

Referring now to the drawings wherein the showings are for the purposes of illustrating preferred embodiments of the invention only and not for purposes of limiting same, FIGS. 1 and 2 best illustrate the overall arrangement of the subject coupling assembly 10. FIG. 1 illustrates the coupling 10 in its unused condition, while FIG. 2 illustrates the coupling assembly 10 and two associated spaced coaxial pipe ends 12, 14 that are to be joined together in fluid communication by the coupling 10. The pipes 12, 14 are relatively large diameter metal and steel pipes, respectively, and the assembly 10 is particularly suited for use in joining such pipes. Preferably, the respective pipes 12, 14 are steel and polyethylene pipes of the type used in natural gas distribution systems. It should be appreciated, however, that the assembly 10 could be used for joining other types of pipes without departing from the overall scope and intent of the present invention.

Referring to FIG. 2, the coupling 10 is defined by a first end A adapted for receiving and retaining a metal pipe end 12, and an opposite, second end B adapted for receiving and retaining a plastic pipe end 14. The coupling 10 is similar to the coupling disclosed in commonly owned U.S. Pat. No. 5,779,285, the disclosure of which is hereby expressly incorporated by reference herein. However, where the coupling described in the aforementioned U.S. Pat. No. 5,779, 285 is symmetrical, the first end A of the present coupling 10 is specifically adapted to receive and retain a metal pipe 12 while the end B is specifically adapted to receive and retain a plastic pipe 14.

With continuing reference to FIG. 2, the pipe ends 12, 14 are cylindrical, and the plastic pipe end 14 is provided with a metal stiffening sleeve element 16 which is sized and arranged so as to be closely received within the pipe end 14 and to be located therein by virtue of a radially extending end flange 16a that engages the end wall of the associated pipe end 14 when the stiffener 16 is fully inserted. Many different materials could be used for the stiffening sleeve but, typically, it is formed of zinc coated steel. The primary function of the stiffening element 16 is to rigidify the plastic pipe end 14 sufficiently to allow it to withstand the significant inwardly directed radial gripping forces applied by the coupling assembly 10.

With reference now to both FIGS. 1 and 2, the assembly 10 further a relatively rigid hollow sleeve member 18 that is of cylindrical shape and is sized so as to be closely received about the pipe ends 12, 14 to fluidically connect same. The opposite first and second axial ends of the sleeve 18 are defined by cylindrical axially outwardly projecting hub portions 18a, 18b that respectively define axially outwardly opening frusto-conical recesses 20a, 20b that converge inwardly toward each other to form respective gasket receiving regions. If desired for strength, the hub portions 18a, 18b can be reinforced with concentric external metal bands 19a, 19b or the like.

Positioned within the two gasket receiving regions are respective annular gaskets 22a, 22b. In particular, the gaskets 22a, 22b are formed from a suitable elastomer and have a frusto-conical outer surface configuration that conforms generally with the surfaces 20a, 20b. In the preferred embodiment, the inner surface of each gasket 22a, 22b converges in a direction moving into the coupling 10 at approximately 10° and is defined by a minor internal diameter dimensioned to be closely received on the outer diameter of the associated pipe end 12, 14. The frusto-conical outer surface of each gasket 22a, 22b is preferably inclined approximately 33° relative to a longitudinal centerline L of the coupling 10. As noted earlier, however, these particular angles are merely preferred for the particular embodiment disclosed herein and when the sleeve member surfaces 20a, 20b are inclined, for example, at an angle of approximately 30° relative to the coupling centerline L.

Referring particularly to the plastic pipe receiving end B of the coupling 10, it can be seen that the coupling further comprises an engagement ring member 24b outwardly adjacent the gasket 22b that has a generally rectangular cross section. The axially inwardly directed face of the ring 24b is, however, recessed as shown at 26b so as to engage partially over and contain the radial outer face of the associated gasket 22b. In the preferred embodiment, the engagement ring 24b is formed of a glass fiber reinforced polypropylene, although other materials can be used provided they have sufficient strength and are compatible with the other materials used.

Figure 3A:
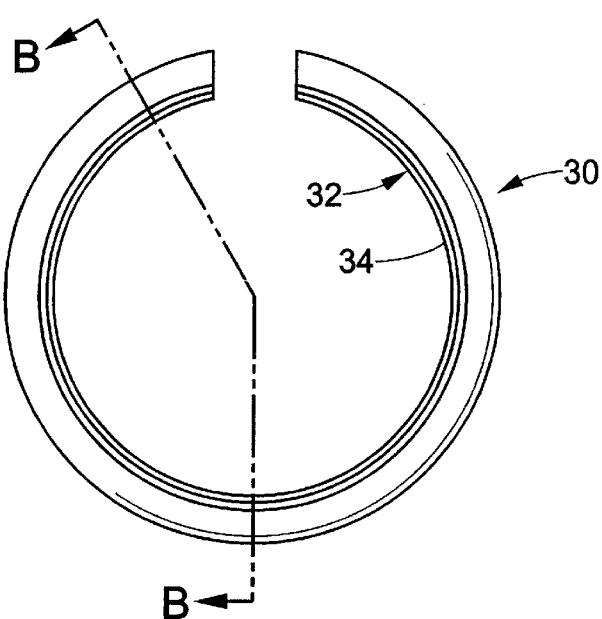
FIG. 3A is an elevational view of a gripping ring member or collet formed in accordance with the present invention as used to secure a plastic pipe in the second end of the coupling of FIGS. 1 and 2.
Figure 3B:
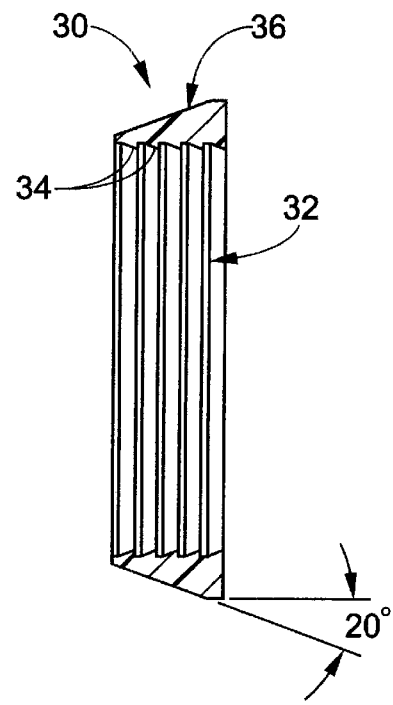
FIG. 3B is a cross-sectional view taken along line B—B of FIG. 3A.

Located axially outwardly of the engagement ring member 24b is a gripping ring member or collet 30 that has the general shape and configuration best shown in FIGS. 3A and 3B. The illustrated collet 30 is substantially similar to that disclosed in the aforementioned U.S. Pat. No. 5,779,285, and is defined by a frusto-conical outer surface shape with an inner diameter that is adapted for close, sliding receipt on the plastic pipe end 14 in the manner partially illustrated in FIG. 2. As shown in FIG. 3A and 3B, the interior surface 32 of the collet 30 is provided with a plurality of relatively sharp radially inwardly directed gripping or bite teeth 34. In the preferred embodiment, there are at least five bite teeth 34.

The outer face 36 of the collet 30 is preferably inclined at an angle of approximately 20° so that it corresponds to and is adapted to mate slidably with a surface of an associated retaining ring member 40b described below. For the present, however, it should be noted that the collet 30 is shaped and positioned so as to be capable of closely engaging about the associated plastic pipe end 14 in the manner shown in FIG. 2. In the preferred embodiment, the collet 30 is formed from a relatively hard plastic, i.e., harder than the pipe end 14, such as an acetal copolymer. Additionally, as best seen in FIG. 3A, the collet 30 is split, i.e., includes a circumferential gap, so as to be adapted for radial inward compression to firmly grip the associated plastic pipe end 14 as described below.

The coupling 10 comprises retaining ring members 40a, 40b located respectively at the opposite first and second ends A,B thereof. With particular reference to the previously mentioned retaining ring 40b located at the coupling second end B, this ring 40b is adapted to be received closely circumferentially about the projecting sleeve hub 18b and the engagement ring 24b to contain these as well as the gasket 22b and collet 30. Preferably, the retaining ring 40b is glass fiber reinforced polypropylene molded to have a generally cylindrical shape. The retaining ring 40b has a first cylindrical inner diameter surface 42b that is dimensioned so as to closely receive the sleeve hub 18b and the engagement ring 24b. Located axially outward (away from the sleeve 18) relative to the cylindrical inner diameter surface 42b is a frusto-conical wall 44b that joins with wall 42b by way of a short radially extending shoulder 46b. In this preferred form, the frusto-conical wall 44b converges in the direction moving axially outward at an angle of approximately 20° relative to the axial center line L of the coupling 10. This corresponds to the angle of the outer surface 36 of the collet 30 so that the outer surface 36 of the collet 30 is adapted for slidably bearing against the wall 44b of the gripping ring 40.

The opposite, metal pipe receiving end A of the coupling 10 is similar to the end B, but employs a specialized metal pipe gripping assembly specifically adapted for firmly engaging and retaining metal pipes such as those defined from steel or cast iron. In addition to the aforementioned gasket 22a, the coupling end B comprises an engagement ring 24a that is similar in all respects to the engagement ring 24b but that is thinner or axially shorter. Like the engagement ring 24b, the ring 24a also includes a recessed axially inwardly directed face 26a for mating with and partially containing the adjacent gasket 22a as shown.

Except as shown and described herein, the retaining ring member 40a located at the end A of the coupling 10 is substantially similar to the retaining ring 40b. The retaining ring 40a defines a cylindrical inner surface 42a that is adapted to be closely received circumferentially about the sleeve hub 18a, the retaining ring 24a, and a metal pipe clamp collar 50. Here, again, the retaining ring 40a is preferably glass fiber reinforced polypropylene molded to have a generally cylindrical shape. Located axially outward (away from the sleeve 18) relative to the cylindrical inner diameter surface 42a is a frusto-conical wall 44a that joins with wall 42a by way of a short radially extending shoulder 46a. Owing to the converging nature of the surface 44a and the presence of the shoulder 46a, those of ordinary skill in the art will recognize that the clamp collar 50, engagement ring 24a, and gasket 22a are trapped between the sleeve 18 and the shoulder 46a. Of course, the surface 44a may be a cylindrical surface.

Figure 5A:
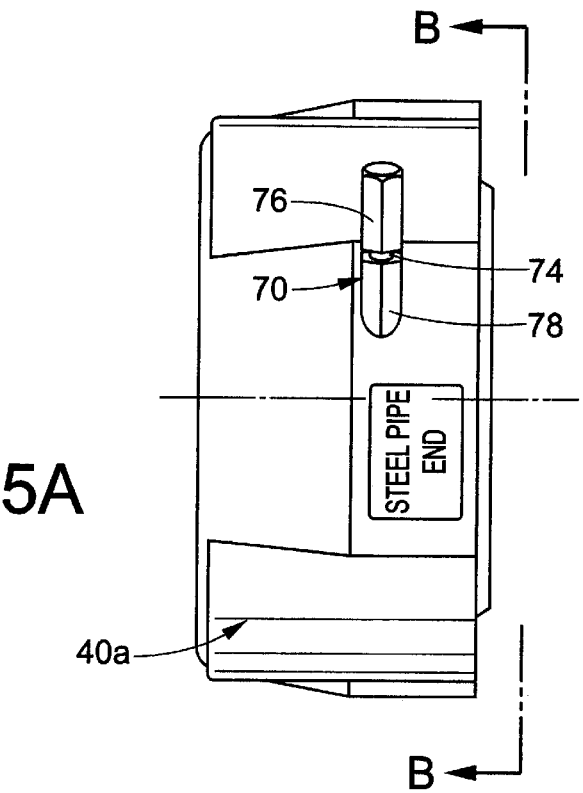
FIG. 5A is a side elevational view of a steel pipe retaining ring member formed in accordance with the present invention; and, FIG. 5B is a view taken along line B—B of FIG. 5A.
Figure 5B:
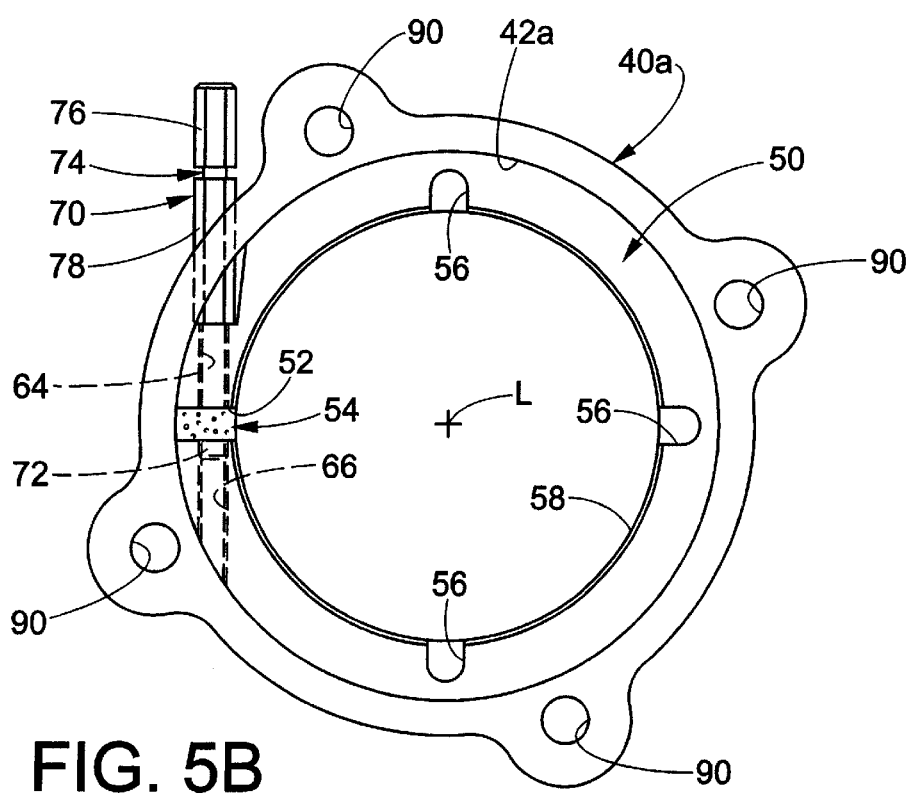

The structure and operation of the clamp collar 50 will be apparent to those of ordinary skill in the art with reference also to FIGS. 5A and 5B. The clamp collar 50 is generally annular and preferably defined from metal that is corrosion resistant or includes a corrosion resistant coating of zinc or the like. The collar 50 is split and, thus, defines a circumferential gap 52 that is preferably filled with a compressible foam material filler or spacer block 54 that keeps debris out of the gap 52 until constriction of the collar 50 is desired. The collar 50 preferably defines radially inwardly directed notches 56 that facilitate its radial constriction about a metal pipe end 12 as described below. The clamp collar 50 includes or defines at least one radially inwardly directed bite tooth 58 adapted to engage and retain the outer surface of an associated metal pipe end 12 inserted into the end A of the coupling 10. As illustrated herein, the bite tooth 58 is circumferentially coextensive with the clamp ring 50, itself, but the bite tooth 58 can also be discontinuous if desired. The clamp ring 50 is dimensioned so that, when it is in its unclamp or relaxed state, a metal pipe end 12 inserted into the end A of the coupling 10 is able to pass closely through the clamp ring 50. If desired, the inner surface 60 of the clamp ring 50 can be flared outwardly moving axially away from the sleeve member 18 and bite tooth 58 to facilitate insertion of a pipe end 12 through the clamp ring.

With continuing reference to FIGS. 5A and 5B, the clamp collar 50 is conformed with a generally tangential untapped bore 64 located on a first side of the circumferential gap 52 and an aligned tapped bore 66 located on a second side of the circumferential gap. These bores 64, 66 are adapted to receive a fastener such as a breakaway bolt 70 that is used to selectively radially constrict the clamp collar 50 about a pipe end 12 by closing the circumferential gap 52 so that the bite tooth 58 firmly engages and retains an associated pipe end 12. Specifically, the breakaway bolt 70 passes through an aligned opening defined in the retaining ring member 40a and also through the untapped bore 64 of the clamp collar. The bolt 70 includes a threaded distal end 72 that engages the threaded bore 66 of the collar. Thus, rotation of the breakaway bolt 70 in a first direction closes the gap 52 (and compresses the spacer 54) while rotation of the bolt 70 in the opposite direction opens the gap 52. The breakaway bolt is partially defined by a weakened or reduced-strength portion 74 located between a driving head 76 and the threaded distal end 72. This reduced-strength section 74 is designed to fracture upon application of a select amount of torque to the driving head 76 so that the head 76 is separated from the remainder of the bolt 70 to ensure at least a minimum bite preload is present and also to prevent overtightening of the bolt 70 as could cause damage to the pipe end 12. When the head 76 is separated from the bolt 70 in this manner, an installer of the coupling 10 can be certain that the clamp collar 50 has been sufficiently constricted to securely grip an associated pipe end 12. The bolt 70 is preferably defined with a secondary driving portion 78 located between the weakened zone 74 and the distal end 72 that is accessible external to the retaining ring member 40a and usable, even after the driving head 76 has been separated from the bolt 70, to reverse the bolt 70 as required to enlarge the clamp collar 50 and remove the pipe end 12 from the coupling 10. Of course, another actuation member can be used in place of the bolt 70 and operably engaged with the clamp collar 50 to selectively constrict the collar.

In the preferred embodiment, the retaining rings 40a, 40b are secured together and driven toward one another by at least one and preferably a plurality of axially extending fasteners such as tie bolts 80 (FIGS. 1 and 2) that pass through aligned bores 90 defined respectively in the spaced-apart retaining members 40a, 40b. The tie bolts 80 include threaded ends 82 that receive suitable nuts 84 and washers 86 and headed ends 88. Preferably, the tie bolts 80 are formed from stainless steel or another corrosion resistant material. Of course, other suitable means may be alternatively employed for urging the retaining members 40a, 40b toward each other.

Figure 4B:
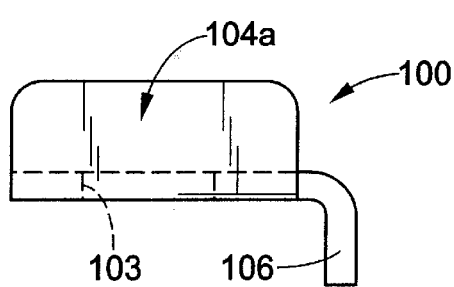
FIG. 4B is a side elevational view of the bolt clip of FIG. 4A.
Figure 4A:
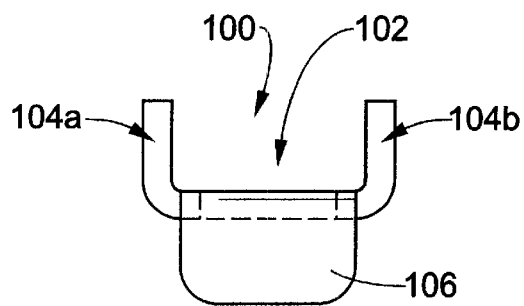
FIG. 4A is a front elevational view of a bolt clip that forms a part of the coupling assembly of FIGS. 1 and 2.

Bolt clips 100 are preferably positioned between the headed ends 88 of each tie bolt 80 and the relevant retaining member 40a, 40b. With reference also to FIGS. 4A and 4B, a suitable bolt clip 100 is preferably defined from corrosion resistant metal and defines a bolt head receiving channel 102 between outwardly projecting tabs 104a, 104b and a bolt receiving bore 103. The channel 102 is adapted to receive a headed end 88 of an associated tie bolt 80 with a close fit so that the bolt 80 cannot rotate relative to the clip 100 when the bolt 80 is passed through the bore 103. The clip 100 further includes a tongue 106 adapted to lie adjacent the relevant retaining ring member 40a, 40b of the coupling 10 in a recessed region 108 thereof so that the clip 100, itself, does not rotate upon application of torque to the associated nut 84. These bolt clips 100 serve the purposes of: (a) acting as a washer; (b) restraining the bolts 80 against rotation upon advancement or retraction of the associated nut 84 on the opposite end 82 of a bolt 80; and, (c) preventing overtightening of the associated nut 84 by way of the tabs 104a, 104b deforming away from each other to allow rotation of the bolt 80 upon application of excessive torque to the associated nut 84.

With the various components assembled into the relationship illustrated in FIG. 1, the pipe ends 12, 14 are fully inserted into the respective ends A,B of the coupling 10. The breakaway bolt 70 is then tightened sufficiently until the driving head 76 is sheared therefrom at the weakened portion 74. Then, the nuts 84 of the tie bolts 80 are advanced, preferably in a cross-pattern, to draw the retaining ring members 40a, 40b inwardly toward each other until their respective innermost edges 48a, 48b engage the sleeve member 18. Owing to the various above-described converging surfaces, this causes radial compression of the gaskets 22a, 22b and the collet 30. The precise and controlled compression of these elements is assured by the relationship between the engagement rings 24a, 24b, the sleeve 18, and the retaining ring members 40a, 40b, i.e., the retaining ring members 40a, 40b cannot be moved closer together once their respective inner edges 48a, 48b abut the sleeve member 18. At the same time, the engagement rings 24a, 24b also engage the sleeve 18 while the respective internal shoulders 46a, 46b of the retaining ring members 40a, 40b engage the clamp ring 50 and the engagement ring 24b, respectively. This relationship as described above also totally encloses the gaskets 22a, 22b and the engagement rings 24a, 24b so that they are not exposed to the surrounding environment. Those of ordinary skill in the art will also recognize that the engagement rings 24a, 24b also act as thrust washers and prevent damage to the relatively soft gaskets 22a, 22b by the clamp collar 50 and collet 30, respectively.

The invention has been described with reference to preferred embodiments. Obviously, modifications and alterations will occur to others upon a reading and understanding of this specification. It is intended that the invention include all such modifications and alterations insofar as they are encompassed by the appended claims as construed literally and/or according to the doctrine of equivalents.

Having thus described the preferred embodiments, what is claimed is:

1. A coupling comprising:
 a first end defining a first open region adapted for receipt of an associated metal pipe end;
 a selectively constrictable collar located in said first open region, said collar, when unconstricted, adapted for receipt onto an associated metal pipe end inserted into said first open end;
 an actuation member engaged with said collar and selectively movable to constrict said collar into gripping engagement with an associated metal pipe end inserted through the collar;
 a second end defining a second open region in fluid communication with said first open region and adapted for receipt of an associated plastic pipe end, said second end including a movable portion having a tapered inner surface that at least partially defines said second open region, said tapered inner surface converging in a direction moving away from said first end;
 a selectively constrictable gripping ring located in said second open region, said gripping ring, when unconstricted, defining an inner diameter adapted for receipt onto an associated plastic pipe end inserted into said second open region and defining a tapered outer surface; and,
 at least one tie fastener operably engaged with said movable portion and selectively adjustable to move the movable portion into engagement with said gripping ring so that said tapered inner surface of said movable portion bears against said tapered outer surface of said gripping ring to constrict said gripping ring radially about an associated plastic pipe end inserted in said second open region and through the gripping ring.

2. The coupling as set forth in claim 1, further comprising:
 a first gasket located in said first open region for sealingly engaging a first inner surface that defines said first open region to an associated metal pipe end inserted into said first open region; and,
 a second gasket located in said second open region for sealingly engaging a second inner surface that at least partially defines said second open region to an associated plastic pipe end inserted into said second open region.

3. The coupling as set forth in claim 2, further comprising:
 a first engagement ring located in said first open region between said collar and said first gasket to maintain spacing between said collar and said gasket; and,
 a second engagement ring located in said second open region between said gripping ring and said second gasket to maintain spacing between said gripping ring and said gasket.

4. The coupling as set forth in claim 3, wherein said first and second engagement rings include inner faces adjacent said first and second gaskets, respectively, and wherein said inner faces of said first and second engagement rings are recessed so that said first and second engagement rings at least partially radially constrain said first and second gaskets, respectively.

5. The coupling as set forth in claim 1, wherein said actuation member comprises a break-away bolt that constricts said collar upon advancement of said break-away bolt relative to said collar, said break-away bolt having an inner end threadably engaged with said collar, an opposite outer end that defines a first driving head and a weakened zone located between said first driving head and said inner end, said weakened zone adapted to shear upon application of at least a select amount of torque to said first driving head.

6. The coupling as set forth in claim 5, wherein said break-away bolt further defines a second driving head located between said weakened zone and said inner end.

7. The coupling as set forth in claim 1, wherein said collar comprises an annular metal collar defining an inner diameter having at least one radially inwardly directed bite-tooth.

8. The coupling as set forth in claim 7, wherein said collar is split and defines an open circumferential gap, and wherein said coupling further comprises:
 a resilient compressible spacer block located in and filling said circumferential gap defined by said collar.

9. The coupling as set forth in claim 1, wherein said gripping ring comprises an annular plastic member that defines a plurality of radially inwardly directed bite-teeth on said inner diameter thereof.

10. The coupling as set forth in claim 9, wherein said gripping ring is split and defines a circumferential gap.

11. The coupling as set forth in claim 1, further comprising:
 a central hollow sleeve member defining first and second hubs at opposite axial ends, wherein said first end of said coupling comprises a first retaining ring member slidably received on said first hub, said second end of said coupling comprising a second retaining ring member slidably received on said second hub and defining said tapered inner surface and said at least one tie fastener comprises a plurality of tie-bolts that extend between and interconnect said first and second retaining rings, said tie-bolts selectively usable to move said first and second retaining rings toward each other.

12. The coupling as set forth in claim 11, wherein each tie bolt includes a headed end and a threaded end, and wherein said coupling further comprises:
 a plurality of clips, wherein each clip is positioned between the headed end of a respective tie-bolt and one of said first and second retaining rings and defines a channel for closely receiving the headed end of the respective tie-bolt, wherein each of said clips is engaged with said one of said first and second retaining rings so as to restrain the headed end of the respective tie-bolt against rotation upon advancement of an associated nut onto the threaded end of the respective tie-bolt.

13. The coupling as set forth in claim 11, wherein said central hollow sleeve member defines first and second frusto-conical gasket receiving regions in said opposite ends thereof that converge inwardly toward each other, and wherein said first and second gaskets are respectively positioned in said first and second gasket receiving regions.

14. The coupling as set forth in claim 13, wherein said first and second gaskets are annular and define frusto-conical outer surfaces that mate closely with said first and second frusto-conical gasket receiving regions, whereby said gaskets are radially compressed upon movement of said first and second retaining rings toward each other.

15. The coupling as set forth in claim 6, wherein said first and second driving heads of said break-away bolt are located external relative to said first and second open regions of said coupling.

16. A coupling for joining a plastic pipe end to a metal pipe end, said coupling comprising:
 a body having first and second opposite axial ends, said first end defining a first opening adapted for receipt of an associated metal pipe end and said second end defining a second opening in fluid communication with said first opening and adapted for receipt of a plastic pipe end, said second end including a movable member having an inclined inner surface that at least partially defines said second opening;

a clamp collar located in said first opening and defining at least one inwardly directed bite-tooth adapted to engage and retain an outer surface of an associated metal pipe end inserted into said first opening and through the clamp collar;

a fastener operatively engaged with said clamp collar to radially constrict said clamp collar upon advancement of the fastener relative to said collar;

a first annular gasket located in said first opening to sealingly engage an associated metal pipe end inserted into said first opening to a first inner surface of said body that at least partially defines said first opening to prevent fluid passage between said associated metal pipe end and the first inner surface;

a gripping ring located in said second opening, said gripping ring defining an inner diameter adapted for receipt onto an associated plastic pipe end inserted into said second opening and a tapered outer surface that converges in a direction moving away from said first end of said body;

a second annular gasket located in said second opening to sealingly engage an associated plastic pipe end inserted into said second opening to a second inner surface of said body that at least partially defines said second opening; and, means for urging said movable member toward said gripping ring so that said inclined inner surface of said movable member bears against said tapered outer surface of said gripping ring so that said gripping ring constricts radially about an associated plastic pipe end inserted in said second opening and through said gripping ring.

17. A coupling as set forth in claim 16 wherein said body comprises:

a rigid hollow sleeve defining first and second hub portions at opposite axial ends; and, a first retaining ring member received slidably on said first hub portion and at least partially defining said first opening;

wherein said movable member comprises a second retaining ring member received slidably on said second hub portion and at least partially defining said second opening, and wherein said means for urging said movable member comprises a plurality of tie fasteners extending axially between said first and second retaining ring members that are usable to urge said first and second retaining ring members axially toward each other.

18. The coupling as set forth in claim 17, wherein said first retaining ring member circumferentially surrounds said clamp collar and wherein said fastener extends through said first retaining ring member so that a threaded inner end of said fastener is internal to said body and engaged with said clamp collar and an opposite outer end of said fastener is external to said body and projects outwardly away from said first retaining ring member.

19. The coupling as set forth in claim 18, wherein said threaded fastener comprises:

a primary driving portion located at said outer end and adapted to mate with an associated driving tool; and a weakened zone located between said primary driving portion and said inner end, said weakened zone conformed to fracture upon application of a select amount of torque to said primary driving portion.

20. The coupling as set forth in claim 19, wherein said fastener further comprises:

a secondary driving portion located external to said body and adapted to mate with an associated driving tool, said secondary driving portion located between said weakened zone and said inner end.

21. The coupling as set forth in claim 16, wherein said gripping ring comprises a plastic collet having multiple gripping teeth defined on said inner diameter thereof, said collet defining a circumferential gap to facilitate radial constriction of the collet.

22. The coupling as set forth in claim 17, wherein said first and second hub portions are cylindrical and wherein said coupling further comprises:

first and second metal bands respectively closely circumscribing said first and second cylindrical hub portions.

23. The coupling as set forth in claim 16 further comprising:

a first engagement ring located axially between said first gasket and said clamp collar to maintain an axial spacing between said first gasket and said clamp collar; and a second engagement ring located axially between said second gasket and said gripping ring to maintain an axial spacing between said second gasket and said gripping ring.

24. The coupling as set forth in claim 23, wherein said first engagement ring defines a first recessed face that abuts said first gasket and limits radial expansion said first gasket.

25. The coupling as set forth in claim 24, wherein said second engagement ring defines a second recessed face that abuts said second gasket and limits radial expansion of said second gasket.

26. The coupling as set forth in claim 17, wherein each of said tie fasteners comprises a tie bolt having a driving head at a first end and threads at a second end, said coupling further comprising:

a plurality of bolt-retaining clips each defining a head-receiving channel and an aperture between first and second tabs wherein each of said clips is located between a driving head of a respective one of said tie bolts and said coupling body with said respective one of said tie bolts extending through said aperture so that said driving head of said respective tie bolt is located in said head-receiving channel between said tabs and restrained against rotation; and a plurality of nuts threadably secured to said second ends of said tie bolts, respectively.

27. The coupling as set forth in claim 26, wherein each of said plurality of clips is non-rotatably engaged with said coupling body and wherein said tabs of each clip are conformed to deflect outwardly away from each other when a select amount of torque is transferred to the driving head of the tie bolt located between the tabs when the nut located on the second end of the respective tie bolt is advanced.

28. The coupling as set forth in claim 16, wherein said clamp collar is metal and said gripping ring is plastic.

29. The coupling as set forth in claim 28, wherein said clamp collar is split so that a circumferential gap is defined between first and second sides of said clamp collar, said clamp collar defining an untapped tangential bore located on said first side of said gap and a tapped tangential bore on said second side of said gap, said tapped bore aligned with said untapped bore, wherein said fastener extends through said untapped bore and is threadably engaged with said tapped bore whereby advancement of said fastener into said tapped bore radially constricts said clamp collar and circumferentially constricts said gap.

30. The coupling as set forth in claim 29, further comprising a resilient compressible spacer block located in and filling said gap.

31. A method for joining a metal pipe end to a plastic pipe end, said method comprising:

inserting a metal pipe end into a first end of a coupling and through openings defined in a selectively constrictable collar and a first gasket that are located in said first end of said coupling so that said collar and first gasket lie adjacent an outer surface of said metal pipe end;

inserting a plastic pipe end into a second end of a coupling and through openings defined in a selectively constrictable gripping ring and a second gasket located in said second end of said coupling so that said gripping ring and said second gasket lie adjacent an outer surface of said plastic pipe end;

constricting said collar into biting engagement with said outer surface of said metal pipe end;

moving said first and second ends of said coupling toward each so that a tapered inner surface of said second end of said coupling engages a tapered outer surface of said gripping ring and radially constricts said gripping ring into gripping engagement with said outer surface of said plastic pipe end.

32. A coupling comprising:

a body including: (i) a hollow central member; (ii) a first retaining member located at a first axial end of said central member; and, (iii) a second retaining member located at a second axial end of said central member, wherein said first retaining member and said central member together define a first pipe receiving region, said second retaining member and said central member together define a second pipe receiving region having a tapered inner surface and said first and second retaining members are axially movable toward each other;

a selectively constrictable clamp collar located in said first pipe receiving region for at least partially encircling an associated metal pipe end inserted into said first pipe receiving region;

an actuation member operably engaged with said clamp collar and selectively movable to constrict said clamp collar into positive engagement with an associated metal pipe end at least partially encircled thereby;

a selectively constrictable gripping collet located in said second pipe receiving region for at least partially encircling and associated plastic pipe end inserted into said second pipe receiving region, said collet including a tapered outer surface; and, at least one fastener extending between and operably engaged with said first and second retaining members, said at least one fastener selectively adjustable to draw said first and second retaining members toward each other so that said tapered inner surface of said second pipe receiving region engages said tapered outer surface of said collet to constrict said collet radially about an associated plastic pipe end at least partially encircled thereby.

* * * * *